US009637225B1

(12) United States Patent
Zickuhr

(10) Patent No.: US 9,637,225 B1
(45) Date of Patent: May 2, 2017

(54) AIRCRAFT WINGLET

(71) Applicant: CESSNA AIRCRAFT COMPANY, Wichita, KS (US)

(72) Inventor: Thomas Dean Zickuhr, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 31 days.

(21) Appl. No.: 14/942,943

(22) Filed: Nov. 16, 2015

(51) Int. Cl.
*B64C 23/06* (2006.01)

(52) U.S. Cl.
CPC .................................. *B64C 23/065* (2013.01)

(58) Field of Classification Search
CPC .............................. B64C 23/065; Y02T 50/164
USPC ....................................................... 244/199.4
See application file for complete search history.

(56) References Cited

U.S. PATENT DOCUMENTS

| 5,275,358 | A | 1/1994 | Goldhammer et al. | |
|---|---|---|---|---|
| 5,348,253 | A | 9/1994 | Gratzer et al. | |
| 5,407,153 | A | 4/1995 | Kirk et al. | |
| 6,484,968 | B2 | 11/2002 | Felker | |
| 2012/0049010 | A1* | 3/2012 | Speer | B64C 23/065 244/45 R |
| 2016/0340029 | A1* | 11/2016 | Williams | B64C 23/065 |

FOREIGN PATENT DOCUMENTS

EP           1349778 B1       2/2007

OTHER PUBLICATIONS

Boeing Commercial Airplace Company, Design and Analysis of Winglets for Miltary Aircraft, Military AFFDL-TR-76-6, Feb. 1976, 216 pages.
The Boeing Commercial Airplane Company, NASA Contractor Report 3164, Selected Advanced Aerodynamics and Active Controls Technology Concepts Development on a Derivative B-747 Aircraft, Final Report, 1980, 303 Pages.
DG Flugzeugbau GMBH, Flight Manual for the LS 8-18 Sailplane, Jul. 1999, 55 pages.
Reexamination No. 90/012,045, filed Dec. 12, 2011, 342 pages.

* cited by examiner

*Primary Examiner* — Richard G Davis
(74) *Attorney, Agent, or Firm* — Erise IP, P.A.

(57) ABSTRACT

Embodiments of the present invention relate to a winglet for an end or tip of an aircraft wing. The winglet includes an inner portion that curves upward having a large radius of curvature near the wing, a middle portion having a small radius of curvature forming a bend, and an outer portion having a large radius of curvature extending to a tip of the winglet. The winglet lowers induced drag of the wing and improves aircraft performance especially for wing tip extensions that extend upwards about equal to or slightly more than outwards.

20 Claims, 6 Drawing Sheets

AIRCRAFT WINGLET

BACKGROUND

Aircraft rely upon a wing for both generating the required lift of the vehicle as well as for controlling in-air maneuvers. The wing also creates drag as it generates lift. This drag-due-to-lift phenomena is better known as "induced drag." Induced drag can be reduced if the lift on the wing is distributed elliptically along its span. That is, the lift per unit span should vary elliptically, with the largest amount of lift at the wing centerline and then dropping elliptically towards the wing tip.

Air pressure under the wing is higher than the air pressure on the top side of the wing, thereby generating lift. However, at the tip of the wing, this higher pressure air from the bottom surface of the wing has a tendency to roll around the wing tip towards the lower pressure surface, thereby creating a wing tip vortex and reducing the efficiency of the wing. Improvements in the form of winglets or wing tip planforms, such as flat plates at the wing tip, to reduce this vortex have been employed for many years. However, many types of winglet and wing tip planforms are inefficient themselves and can be further optimized to improve wing efficiency and performance.

SUMMARY

The present invention relates generally to an extension of the end or tip of an aircraft wing, and more specifically to an extension that curves in an upward direction from the wing surface.

According to an embodiment of the present invention, an aircraft winglet is provided. The aircraft winglet includes a wing tip extension projecting outward from an end of a wing and curving upward from the wing, the winglet having an inner portion with a first radius of curvature near the wing, a middle portion having a second radius of curvature forming a bend, and an outer portion having a third radius of curvature extending to a tip of the winglet. The first radius of curvature at the inner portion is greater than the second radius of curvature at the middle portion.

In an alternate embodiment of the present invention, a curved wing tip extension for an aircraft wing is provided. The wing tip extension comprises an inner portion adjacent the aircraft wing having a first radius of curvature, a middle portion adjacent the inner portion, where the middle portion has a second radius of curvature, and an outer portion adjacent the middle portion and extending to a winglet tip, where the outer portion has a third radius of curvature. The radii of curvature are sized such that the first and third radius of curvature are each larger than the second radius of curvature.

In yet another embodiment of the present invention, a compound curved wing tip extension for an aircraft wing is provided. The curved wing tip comprises an airfoil body having a leading edge, a trailing edge spaced a distance from the leading edge, and a tip. The leading edge and trailing edge are angled in an aft direction with the airfoil body having an inner portion adjacent the aircraft wing and a first radius of curvature. The airfoil body also has a middle portion adjacent the inner portion, the middle portion having a second radius of curvature, and an outer portion adjacent the middle portion and extending to the tip. The outer portion has a third radius of curvature, with the first and third radius of curvature each larger than the second radius of curvature.

DETAILED DESCRIPTION

Embodiments of the present disclosure provide winglets for improved aerodynamic performance of an aircraft wing. Winglets are a type of wingtip device intended to improve aerodynamic efficiency of an aircraft, by reducing drag for example, without significantly increasing the aircraft's wingspan or weight.

Figure 1:
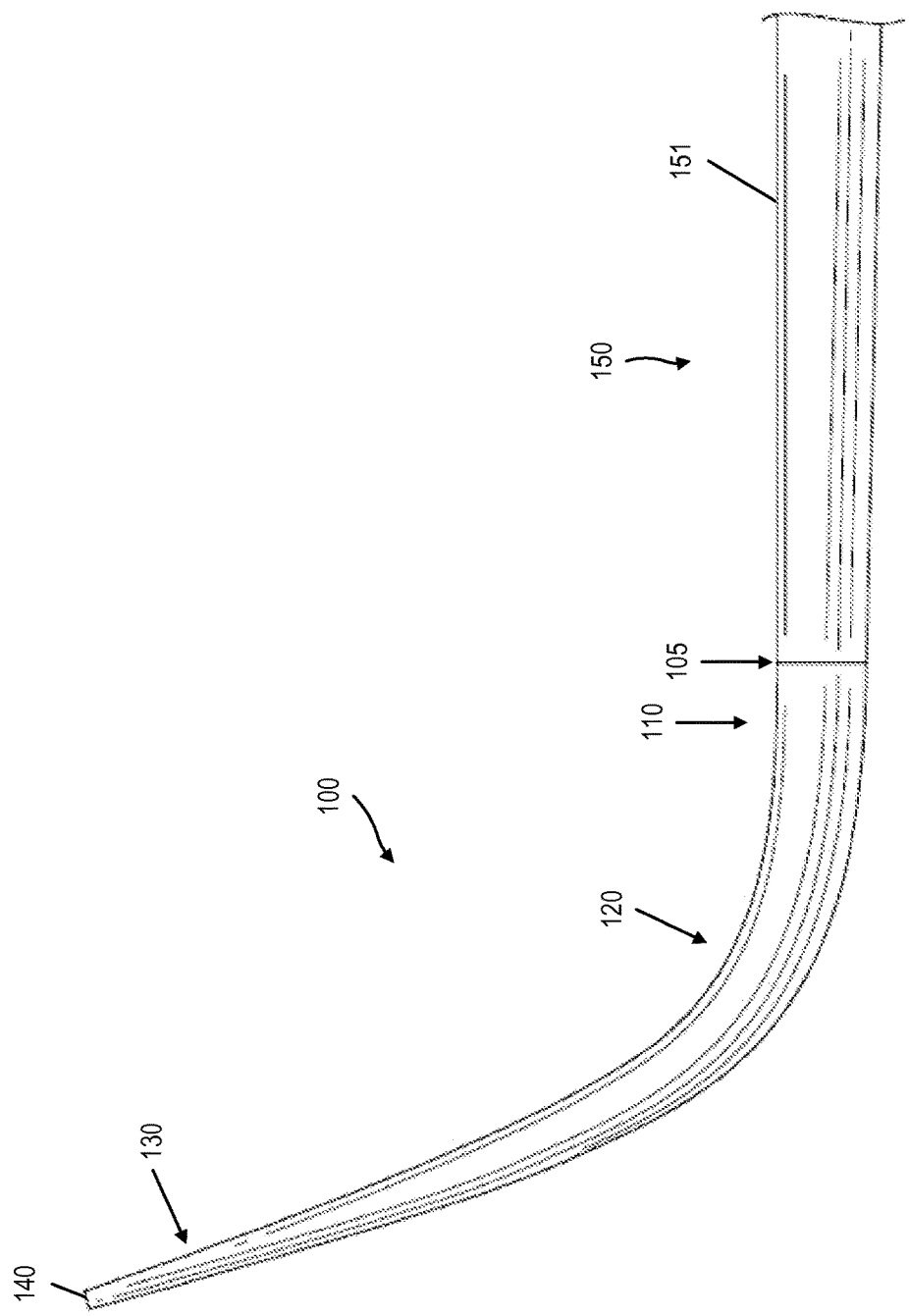
FIG. 1 depicts a profile view of a winglet attached to a wing, in accordance with an embodiment of the present invention.

FIG. 1 illustrates a profile view of an exemplary winglet 100 attached to a wing 150. Winglet 100 attaches to wing 150 at an end 105. Winglet 100 may be designed as a separate part to be attached the end of wing 150 to simplify manufacturing. Winglet 100 extends outward from the end of wing 150 and curves upward from wing 150. Specifically, winglet 100 includes an inner portion 110 that curves upward with a first radius of curvature near the wing, followed by a middle portion 120 with a second radius of curvature forming a bend, and ending with an outer portion 130 having a third radius of curvature extending to a tip 140 of winglet 100. See FIG. 6 for exemplary winglet radius of curvatures.

Figure 2:
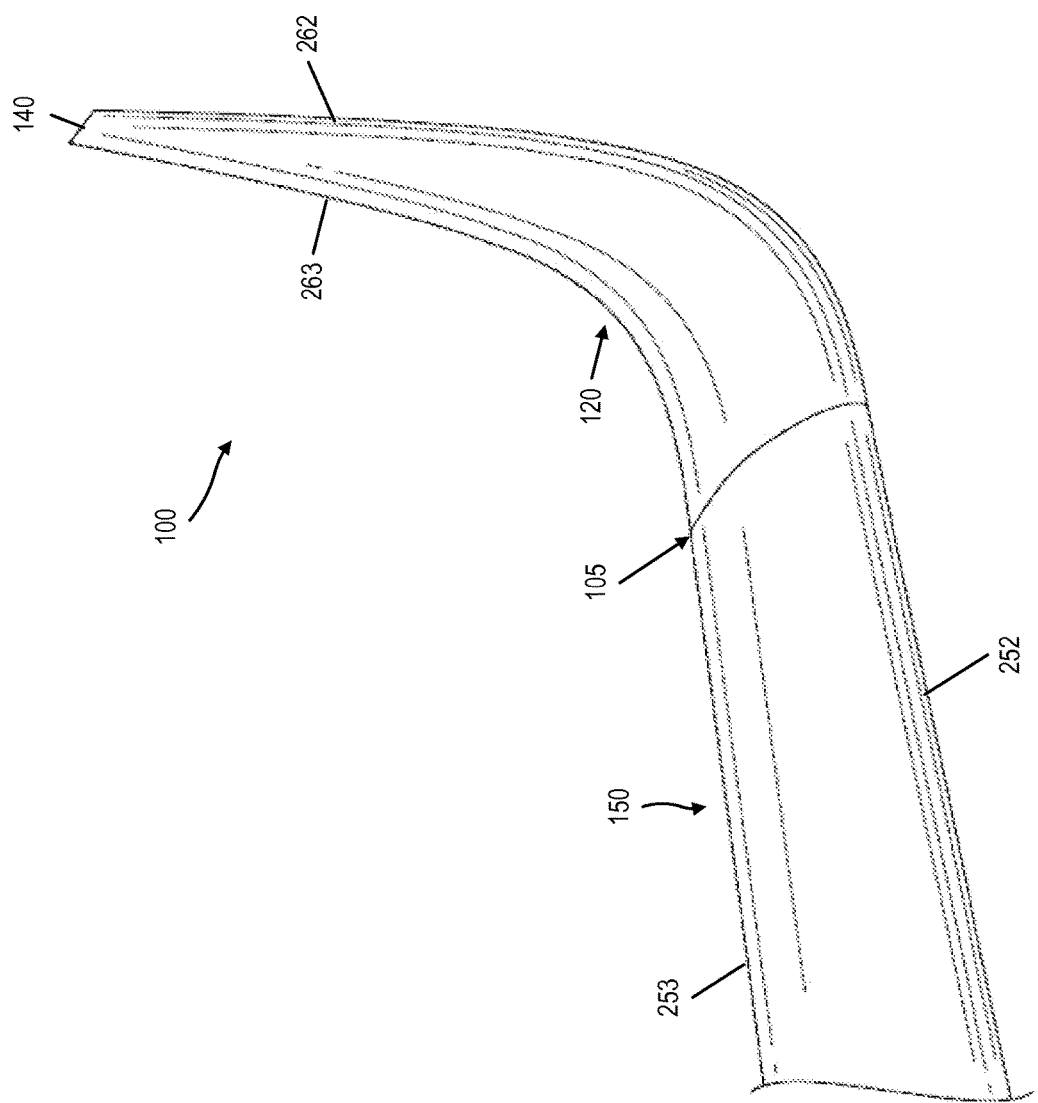
FIG. 2 shows a perspective view of the winglet and wing of FIG. 1.

FIG. 2 shows winglet 100 of FIG. 1 from an aft-looking perspective view, showing wing 150 having a wing leading edge 252 and a wing trailing edge 253. The winglet 100 has a winglet leading edge 262 and a winglet trailing edge 263.

Figure 3:
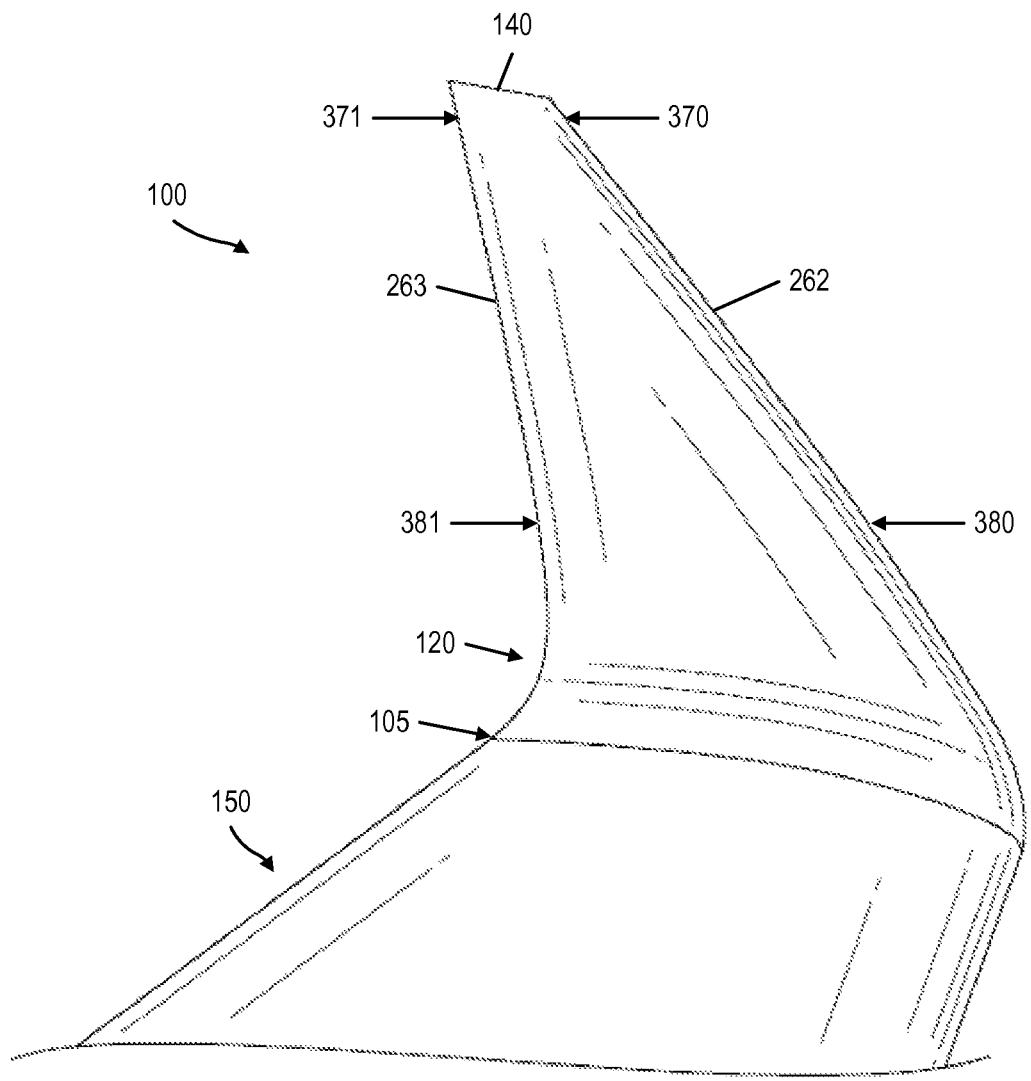
FIG. 3 shows the winglet and wing of FIG. 1 from an outboard perspective view.

FIG. 3 shows an outboard perspective view of winglet 100 of FIG. 1. Winglet 100 tapers in length from the middle portion 120 towards tip 140, as indicated by the smaller distance between arrows 370 and 371 compared to the larger distance between arrows 380 and 381. In other words, winglet 100 may include a tapered width, or chord, extending from bend 120 to tip 140. Winglet 100 may also have a swept shape such that both winglet leading edge 262 and winglet trailing edge 263 tilt back in an aft direction. Winglet leading edge 262 tilts more than winglet trailing edge 263 in the aft direction forming the tapered width described above. For example, a winglet leading edge 262 may be tilted, or swept, about 53 degrees from vertical towards the aft direction while winglet trailing edge 263 tilts, or is swept, about 28 degrees from vertical towards the aft direction. Alternate sweep angles are possible and as such, the sweep angles can range from approximately 20 degrees to about 65 degrees from vertical.

Figure 4:
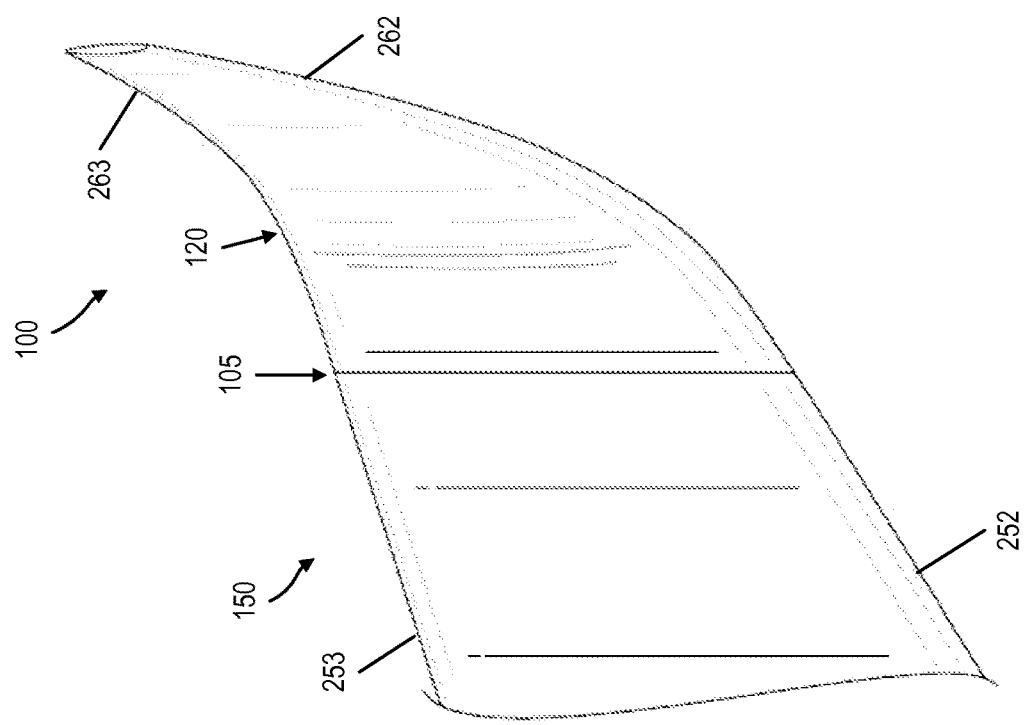
FIG. 4 shows a top perspective view of the winglet and wing of FIG. 1.

FIG. 4 shows a top elevation view of winglet 100 of FIG. 1 attached to wing 150 at end 105. In an embodiment of the invention, the sweep of winglet 100 mimics a sweep of wing

150, including that wing leading edge 252 sweeps back in an aft direction at a greater angle than wing trailing edge 253 sweeps back in an aft direction.

One advantage of winglet 100 is to reduce drag due to lift. Drag due to lift is referred to as induced drag. Induced drag may be reduced by simply increasing wingspan, which may be achieved by adding straight wingtip extensions that lack an upward curvature, particularly if the wingtip extensions approximate an "ideal" elliptical planform. However, wingtip extensions also increase wing weight and increase wingspan. Increased wingspan typically causes increased bending force moments on the wing, which an existing wing and aircraft structure may not be designed to withstand. Also, overall wingspan may be limited due to operational considerations such as available width of hangar doors or airport gates.

Another advantage of winglet 100, compared to straight wingtip extensions, is derived from having an upwardly curving wingtip extension to form a vertical component (e.g., outer portion 130 of FIG. 1 provides a generally vertical component of winglet 100). The generally vertical component serves to disrupt trailing vortices that form at wingtips due to wing pressure differentials necessary to produce lift (e.g., higher pressure beneath the wing and lower pressure above the wing). The shape of the spanwise transition from wing 150 to winglet 110 may affect both the lift and drag of the aircraft.

An overall improvement of an aircraft lift/drag ratio may be desired during all phases of flight (e.g., liftoff, cruise, maneuvering, etc.) but this is difficult to achieve due to many conflicting constraints. The size, shape, and orientation of winglet 100 is critical for correct performance and may be customized for different applications, such as on different aircraft or for certain flight paths or routes. For example, a given winglet may improve the lift/drag ratio during level steady flight to a greater extent than during liftoff, in which case longer flights would provide a greater efficiency benefit compared to shorter flights. Therefore, the size, shape, and orientation of a winglet may be unique for a given aircraft and the flight performance goals of that aircraft. In an embodiment, winglet 100 is designed to increase aircraft range by providing greater efficiency.

An elliptically-shaped winglet aligned along an ellipse positioned with the major axis of the ellipse approximately perpendicular to the wing plane results in a tall winglet for a given span increase. In contrast, winglet 100 is shorter providing less drag and less weight for a given span increase, resulting in increased aircraft performance.

Winglet size, shape, and orientation also affect aerodynamic properties in addition to drag, such as wing bending moment, flutter, stability and control. These effects provide constraints on the size, shape, and orientation of winglet 100 due to wing bending moment limitations and aircraft stability and control limitations, for example. In addition to a winglet's size, shape, and orientation, how the winglet is connected to the wing also affects overall lift and drag. For example, an abrupt transition between the vertical component of the winglet and the wing may cause interference drag partially negating a benefit of the winglet.

Figure 5:
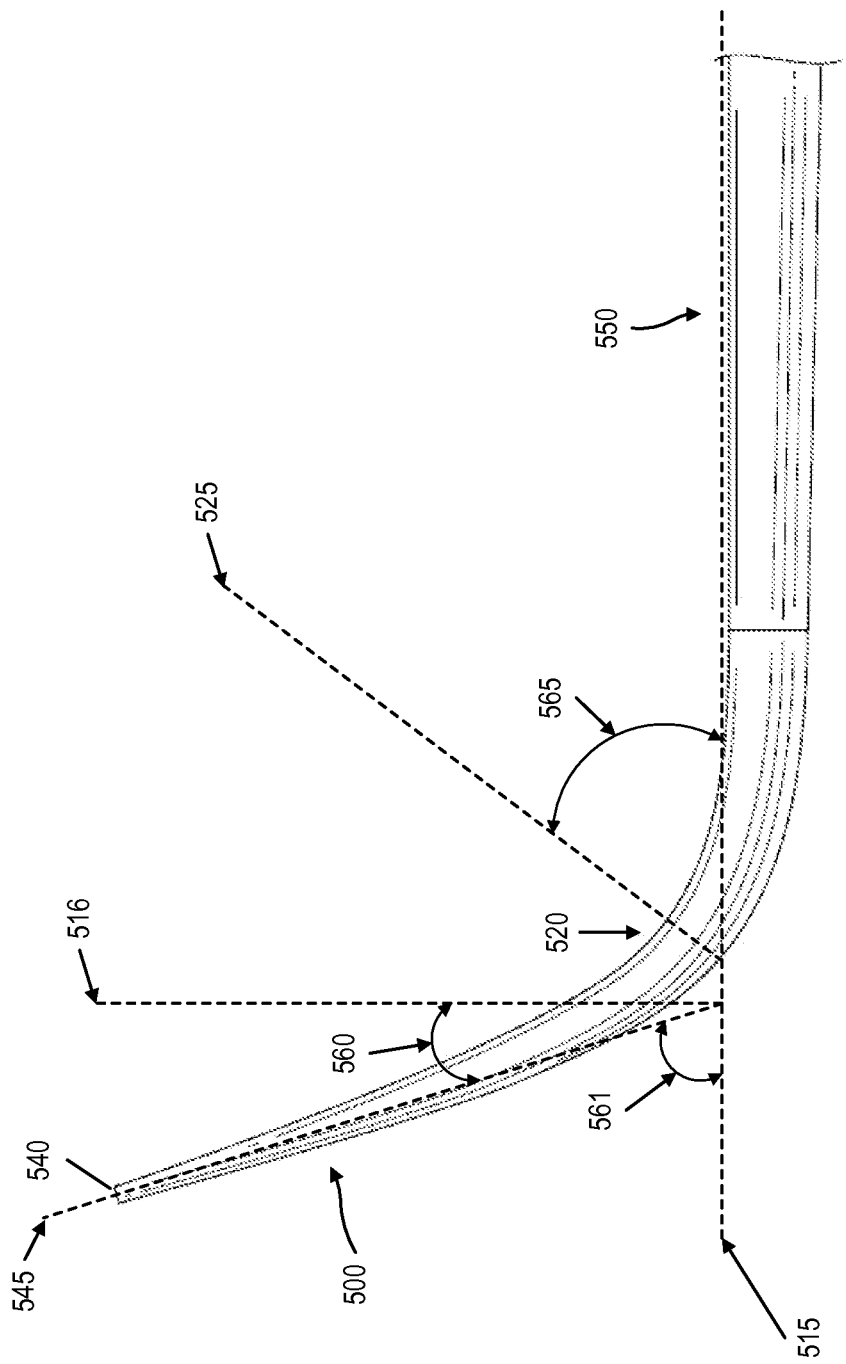
FIG. 5 shows a profile view of a winglet having an exemplary cant angle, an exemplary dihedral angle, and an exemplary major axis angle.

FIG. 5 shows a profile view of an exemplary winglet 500, which is an example of winglet 100 of FIG. 1, illustrating an exemplary cant (i.e., outward) angle 560, an exemplary dihedral (i.e., upward) angle 561, and an exemplary major axis angle 565 (described below). Dashed lines in FIG. 5 illustrate a reference plane, an angle, or a direction according to the following description. A wing surface reference plane 515 parallels a top surface of a wing 550. Vertical line 516 is oriented perpendicular to wing surface reference plane 515. Winglet axis 545 passes through winglet 500 at a tip 540, forming cant angle 560 with vertical line 516. In an embodiment, cant angle 560 is about 17.5 degrees. Larger winglet cant angles provide more span with less wetted area increase to minimize additional parasitic drag. Dihedral angle 561 is formed between winglet axis 545 and wing surface reference plane 515. In an embodiment of the present invention, dihedral angle 561 is about 72.5 degrees. Bend 520 includes a major axis 525 that passes substantially through bend 520 where the radius of curvature is at a minimum (see FIG. 6 for radius of curvatures). Major axis 525 forms major axis angle 565 with wing surface reference plane 515. Major axis angle 565 may range from about 30 degrees to about 60 degrees above wing surface reference plane 515 without departing from the scope hereof. In an embodiment, major axis angle 565 is about 37 degrees, as depicted in FIG. 5. The cant angle 560, dihedral angle 561, and major axis angle 565 are merely representative of an embodiment of the present invention and do not limit the invention to a particular configuration. It is understood that each of the angles discussed herein can vary from the exemplary embodiment.

Figure 6:
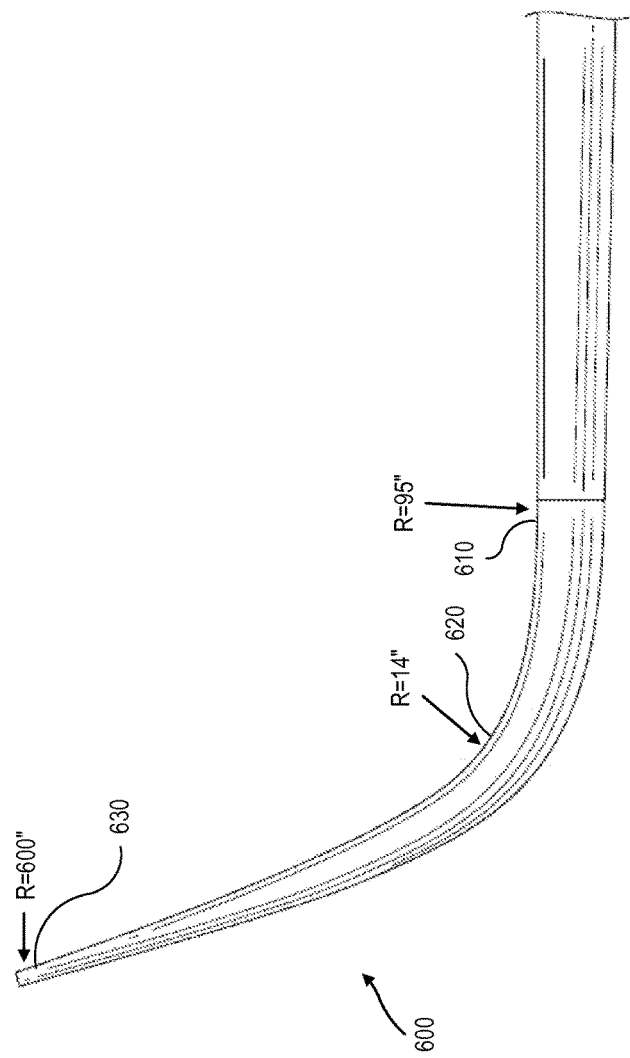
FIG. 6 shows a profile view of a winglet having various radiuses of curvatures at different winglet portions.

FIG. 6 shows a profile view of an exemplary winglet 600 having exemplary radius of curvatures at different winglet portions. In an embodiment of the present invention, an inner portion 610 of winglet 600 has a maximum radius of curvature of about ninety-five inches (R=95") at about a point tangent with the wing, a middle portion 620 has a minimum radius of curvature of about fourteen inches (R=14") forming a bend, and an outer portion 630 has a maximum radius of curvature of about six-hundred inches (R=600") at about a point tangent with the winglet tip. Thus, winglet 600 has a gentle upwardly curving transition from the end of the wing, followed by a tightening radius to form a bend, and finishing with an increasing radius to the tip of the winglet. The resulting winglet shape lowers induced drag while also reducing the height of the winglet for a given span increase, resulting in less wetted area and therefore less parasite drag. The lower height also reduces the weight of the winglet, further improving the performance of the aircraft.

Winglet 100 improves aircraft performance especially for wing tip extensions that extend approximately the same distance upwards as outwards beyond the end of the wing. In an embodiment of the invention, winglet 100 includes a ratio of 1.125 for the height of the tip above the wing compared to the extension of the tip from the end of the wing. This winglet position ratio may range from about 1.0 to about 1.3 without departing from the scope of the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all operations listed in the various figures need be carried out in the specific order described.

The invention claimed is:

1. An aircraft winglet, comprising:
a wing tip extension projecting outward from an end of a wing and curving upward from the wing, the winglet having an inner portion with a first radius of curvature near the wing, a middle portion having a second radius of curvature forming a bend, and an outer portion having a third radius of curvature extending to a tip of the winglet;
wherein the first and third radius of curvature are each larger than the second radius of curvature and the third radius of curvature is larger than the first radius of curvature.

2. The aircraft winglet of claim 1, wherein the winglet comprises a tapered width extending from the bend towards the tip.

3. The aircraft winglet of claim 1, wherein the winglet comprises a swept shape such that both a leading edge and a trailing edge are angled in an aft direction.

4. The aircraft winglet of claim 1, wherein the winglet comprises a winglet sweep angle that mimics a sweep angle of the wing.

5. The aircraft winglet of claim 1, wherein the winglet further comprises a cant angle of about 17.5 degrees and a dihedral angle of about 72.5 degrees.

6. The aircraft winglet of claim 1, wherein the bend has a major axis of about 37 degrees above a wing surface reference plane.

7. The aircraft winglet of claim 1, wherein the first radius of curvature at the inner portion has a maximum radius of about ninety-five inches nearest the wing, the second radius of curvature at the middle portion has a minimum radius of curvature of about fourteen inches, and the third radius of curvature at the outer portion has a maximum radius of curvature of about six-hundred inches.

8. The aircraft winglet of claim 1, wherein a height of the winglet is about proportional to a given span increase, thereby providing less wetted area and less parasite drag.

9. The aircraft winglet of claim 1, wherein the winglet has a ratio for a height of the tip above the wing compared to an extension of the tip from the end of the wing from about 1.0 to about 1.3.

10. A curved wing tip extension for an aircraft wing comprising:
an inner portion adjacent the aircraft wing and having a first radius of curvature;
a middle portion adjacent the inner portion, the middle portion having a second radius of curvature;
an outer portion adjacent the middle portion and extending to a winglet tip, the outer portion having a third radius of curvature;
wherein the first and third radius of curvature are each larger than the second radius of curvature and the third radius of curvature is larger than the first radius of curvature.

11. The curved wing tip extension of claim 10, wherein the first radius of curvature has a radius up to approximately ninety-five inches at the inner portion adjacent the wing.

12. The curved wing tip extension of claim 11, wherein the second radius of curvature has a radius of at least about fourteen inches.

13. The curved wing tip extension of claim 12, wherein the third radius of curvature has a radius up to approximately six-hundred inches at the outer portion adjacent the winglet tip.

14. The aircraft winglet of claim 10, wherein the curved wing tip extension further comprises a cant angle of about 17.5 degrees and a dihedral angle of about 72.5 degrees.

15. A compound curved wing tip extension for an aircraft wing comprising an airfoil body having a leading edge, a trailing edge spaced a distance from the leading edge, and a tip, the leading edge and trailing edge angled in an aft direction, the airfoil body having an inner portion adjacent the aircraft wing and having a first radius of curvature, a middle portion adjacent the inner portion, the middle portion having a second radius of curvature, and an outer portion adjacent the middle portion and extending to the tip, the outer portion having a third radius of curvature, with the first and third radius of curvature each larger than the second radius of curvature and the third radius is larger than the first radius of curvature.

16. The compound curved wing tip extension of claim 15, wherein the leading edge and trailing edge are angled aft between approximately 20 and 65 degrees.

17. The compound curved wing tip extension of claim 16, wherein the curved wing tip extension further comprises a cant angle of about 17.5 degrees and a dihedral angle of about 72.5 degrees.

18. The compound curved wing tip extension of claim 17, wherein the first radius of curvature has a radius up to approximately ninety-five inches at the inner portion adjacent the wing and the third radius of curvature has a radius up to approximately six-hundred inches at the outer portion adjacent the winglet tip.

19. The compound curved wing tip extension of claim 18, wherein the second radius of curvature has a radius of at least about fourteen inches.

20. The compound curved wing tip extension of claim 19, wherein the second radius of curvature forms a bend having a major axis of about 37 degrees above a wing surface reference plane.

* * * * *